United States Patent [19]

Hoover et al.

[11] 3,713,859
[45] Jan. 30, 1973

[54] DISPERSING CLAYS, PIGMENTS AND THE LIKE WITH AMINO

[75] Inventors: Merwin Frederick Hoover, Pittsburgh; Gloria DiMarco Sinkovitz, Bridgeville, both of Pa.

[73] Assignee: Calgon Corporation, Pittsburgh, Pa.

[22] Filed: Nov. 18, 1970

[21] Appl. No.: 90,857

[52] U.S. Cl.................106/308 N, 106/72, 106/309
[51] Int. Cl.............................C09c 1/42, C09c 3/02
[58] Field of Search..106/308 N, 72, 309; 252/8.5 C; 260/502.5

[56] References Cited

UNITED STATES PATENTS

| | | | |
|---|---|---|---|
| 3,303,139 | 2/1967 | Blaser et al. | 252/180 |
| 3,446,582 | 5/1969 | Smith et al. | 23/107 |
| 3,346,487 | 10/1967 | Irani et al. | 252/8.5 |
| 3,346,488 | 10/1967 | Irani et al. | 252/8.5 |
| 3,536,752 | 10/1970 | Crutchfield | 260/502.5 |

*Primary Examiner*—Delbert E. Gantz
*Assistant Examiner*—J. V. Howard
*Attorney*—William L. Krayer and Herbert J. Zeh, Jr.

[57] ABSTRACT

The disclosure is directed to the use of water-soluble amino diphosphonates as deflocculating agents for finely divided solid materials in an aqueous dispersion, slurry and the like, especially as deflocculating agents for the preparation of high solids, low viscosity slurries of pigments and clays for use in paper coatings. The useful amino diphosphonates are represented by the following formula

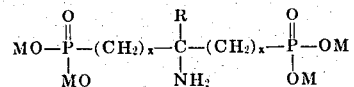

where R is an alkyl group of one to five carbon atoms, phenyl or benzyl and where $x$ is 0 or 1 and where each M is independently selected from the group consisting of hydrogen, alkali metal, alkaline earth metal, and ammonium.

9 Claims, No Drawings

DISPERSING CLAYS, PIGMENTS AND THE LIKE WITH AMINO

BACKGROUND OF THE INVENTION

This invention is directed to stable aqueous dispersions of finely divided solids such as clays, pigments and the like. More particularly, this invention is directed to the use of water-soluble amino diphosphonates as deflocculating agents for preparing stable aqueous dispersions of finely divided solids.

Many industrial processes employ aqueous suspensions or slurries in which water is used as a vehicle for conveying solids. In addition, many consumer products are aqueous dispersions of finely divided solids. Some examples of the industrial processes are the wet processing of cement, oil well drilling muds, kaolin processing, and pigment and clay slurries for paper coatings. An example of widely accepted consumer products are the latex paints. In all of the above processes and products it is desirable, if not necessary, to employ a dispersant to maintain the finely divided solids in a deflocculated state and to alter the rheological properties of the system. For example, pigments and clays used for paper coatings have long required the employment of dispersants to ensure a coating color with a workable viscosity. It is highly desirable to use a pigment or clay coating color having as high a solids content as possible. However, without a dispersing agent the coating composition cannot be practically handled and still have a desirable high solids content. Yet, when a deflocculating agent is utilized, it is possible to prepare high solids, low viscosity pigment and clay slurries for use in coating colors.

In the past, various compounds have been used as deflocculating agents. For example, one class of compounds that has gained widespread use as dispersants is the molecularly dehydrated inorganic phosphates. See Hansen, U.S. Pat. No. 2,750,299, which discloses the use of a sodium metaphosphate glass to disperse calcium carbonate. More recently, organic phosphates have been employed as deflocculating agents. For example, see Lyons et al., U.S. Pat. No. 3,346,488, which is directed to amino methylene phosphonates as deflocculating agents and Irani et al., U.S. Pat. No. 3,346,487, which is directed to the use of alkylene diphosphonates as deflocculating agents. Other common deflocculating agents which have been used are polystyrene sulfonate, polyacrylic acid, polymethacrylic acid and napthaline sulfonate formaldehyde condensates.

While most of the above dispersants are effective, many of them suffer from one or more drawbacks. For example, a deflocculating agent should be hydrolytically stable. However, it is well known that the inorganic polyphosphates are hydrolytically unstable. In addition, other deflocculating agents are not temperature stable and are subject to shear degradation. Finally, some of the prior art dispersants are not as effective as desired.

Therefore, it is an object of this invention to provide an effective deflocculating agent which is hydrolytically stable, temperature stable and which has good shear stability.

SUMMARY OF THE INVENTION

We have found that certain water-soluble amino diphosphonates are effective deflocculating agents and are hydrolytically stable, temperature stable, and shear stable. The amino diphosphonates of our invention are represented by the following formula

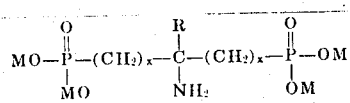

where R is an alkyl group of one to five carbon atoms, phenyl or benzyl and where $x$ is 0 or 1 and where each M is independently selected from the group consisting of hydrogen, alkali metal, alkaline earth metal, and ammonium such that the resulting phosphonate salt is readily water soluble.

When $x$ is 0, the compounds of our invention may be named as substituted 1-amino methane, 1-1, diphosphonic acid. For example, when R is phenyl, the compound is called 1, amino, 1 phenyl methane 1,1 diphosphonic acid ($\alpha$ amino benzyl diphosphonic acid). When x is 1, the compounds of our invention may be named as substituted 1, amino methane 1,-1,-dimethylene-phosphonic acid. For example, when R is phenyl, the compound is called 1-amino, 1-phenyl methane, 1-1-dimethylene-phosphonic acid ($\alpha$ amino benzyl dimethylene phosphonic acid).

The amino diphosphonic acid compounds of our invention are not novel. For example, see Blaser et al. U.S. Pat. No. 3,303,139, which is directed to the use of certain amino diphosphonates as metal complexing agents. See, also, U.S. Pat. Nos. 3,202,579; 3,317,346 and 3,446,582. However, heretofore these compounds have never been employed as deflocculating agents.

There are many different methods for preparing the compounds of our invention as is known by one skilled in the art. Our invention is independent of the method employed to prepare the applicable amino diphosphonates. When $x$ is 0, we have prepared the compounds by utilizing three different processes. The compounds were prepared by reacting an appropriate organic nitrile with a phosphorous trihalide in the presence of acetic acid. Then this intermediate was hydrolyzed with water to yield the amino diphosphonic acid. We have also prepared the compounds by reacting the organic nitrile with an alcohol to form an imino ether which was then reacted with a phosphite and hydrolyzed to yield the amino diphosphonic acid. Finally, we have prepared these compounds by reacting an acid chloride with a phosphite and ammonia and then hydrolyzing the intermediate reaction product to obtain the amino diphosphonate. When $x$ is 1, we have prepared the compounds of our invention by reacting an amine with phosphorous acid and formaldehyde. For example, see United States Pat. Nos. 3,257,479; 3,344,077 and 3,438,902.

We have found that stable aqueous dispersions of finely divided solids may be prepared by incorporating into the dispersion a small but effective amount of one or more of the amino diphosphonates of our invention. Our amino diphosphonates will deflocculate finely divided solids when used at concentrations of at least about 0.01 percent by weight based on the weight of the solids to be dispersed. The maximum amount used will largely be an economic consideration. However, we have found that for all practical purposes concentrations greater than 2.5 percent by weight will seldom, if ever, be used. While the use of about 0.01 percent by weight amino diphosphonate will give an improvement over systems without any deflocculating agent, we have found that for most practical applications at least 0.1 percent is necessary to show a commercially appreciable effect. Preferably, our amino diphosphonates are used at a concentration of from about 0.1 percent to 1.0 percent by weight. In addition, the concentration of the aqueous dispersion may vary over a wide range. The dispersion may contain anywhere up to 70 percent or more by weight of the finely divided solids.

As is recognized by one skilled in the art, the actual concentration of deflocculating agent needed to effectively disperse the solids will depend on such factors as the aqueous system being treated, the solids being deflocculated, the viscosity desired, the presence or absence of contaminants, and the particular amino diphosphonate being used. The concentration ranges given are therefore only a general indication of the concentrations needed. The exact concentration must be determined by an examination of the variables of the system to be deflocculated.

We have found that the deflocculating agents of our invention may be used for dispersing many different finely divided solids in water. Illustrative but not limiting such finely divided solids are the coals (lignite, bituminous, anthracite), bauxite, fuller's earth, ferric oxide, calcium carbonate, zinc oxide, zinc chromate, zinc sulfide, titanium dioxide and many other well-known pigments and clays.

The deflocculating agents of our invention may be added to the finely divided solids by any of a number of different methods as is recognized by one skilled in the art. Our invention is independent of the method of addition so long as the compounds are within the desired concentration range. For example, the amino diphosphonate may be added to an aqueous slurry of the finely divided solids as a dry solid or as an aqueous solution of the diphosphonate. The amino diphosphonate may be admixed with the finely divided solids to form a dry solid admixture which is then dispersed in the aqueous medium. Alternatively, the dry amino diphosphonate and the finely divided solids may be simultaneously added to the aqueous medium. There are many other methods of addition which may be envisioned by the skilled artisan and which will work as effectively as the ones mentioned above. The ultimate method chosen will largely be an engineering decision.

We have performed numerous experiments which demonstrate the effectiveness of our compounds for deflocculating finely divided solids. In addition, for comparison purposes we have performed the same experiments using some of the prior art deflocculants.

A series of dispersions were prepared using 390 grams of kaolin clay (non-predispersed kaolin clay obtained from J. M. Huber Corporation) and 210 grams of distilled water and various amounts of the different deflocculating agents. This gave a dispersion of about 65 percent solids. The dispersions were prepared by placing the water in a wide mouth quart jar and then adding the deflocculating agent and adjusting the pH to 8 to 9 with dilute ammonium hydroxide, if necessary. A Cowles dispersator was placed in the jar to provide the shear necessary for preparing effective dispersions. The clay was then added over a fifteen minute period with moderate agitation. After the clay was added the dispersion was mixed for an additional twenty minutes. Then the initial viscosity was measured with a Brookfield viscometer (model RVF, spindle number 3, 20 rpm) and recorded. The dispersions were capped and stored in an oven at 70°C for about 1 month. The viscosity of the dispersion was measured and recorded at periodic intervals during the month or until the dispersion became dilatant. The dispersion was considered dilatant when it would not flow from the quart jar when inverted. The results for these dispersions are shown in Table 1.

TABLE 1

| deflocculating agent | concentration in percent by wt. | storage time in days | viscosity in cps |
|---|---|---|---|
| Calgon (sodium phosphate glass) | 0.25 | 0 | 175 |
| " | 0.25 | 7 | 14,750 |
| " | 0.25 | 13 | 28,000 |
| " | 0.25 | 21 | dilatant |
| " | 0.50 | 0 | 150 |
| " | 0.50 | 7 | 350 |
| " | 0.50 | 13 | 425 |
| " | 0.50 | 21 | 975 |
| " | 0.50 | 30 | 875 |
| N-(pentamethylenephdt diethylenetriamine | 0.75 | 0 | 410 |
| " | 0.75 | 10 | 5,300 |
| " | 0.75 | 16 | 7,800 |
| " | 0.75 | 23 | 11,200 |
| " | 0.75 | 31 | 19,250 |
| sodium polymethacrylate | 0.75 | 0 | 175 |
| " | 0.75 | 9 | 1,325 |
| " | 0.75 | 17 | 5,700 |
| " | 1.0 | 0 | 50 |
| " | 1.0 | 9 | dilatant |
| alpha aminobenzyl diphosphonic acid (sodium salt) | 0.5 | 0 | 60 |
| " | 0.5 | 6 | 60 |
| " | 0.5 | 13 | 240 |
| " | 0.5 | 17 | settled out |
| " | 0.25 | 0 | 100 |
| " | 0.25 | 6 | 170 |
| " | 0.25 | 13 | 240 |
| " | 0.25 | 17 | 440 |
| " | 0.25 | 30 | 900 |

The results in Table 1 illustrate that the compositions of our invention are effective deflocculating agents. Moreover, the tables indicate that our compounds are hydrolytically stable, temperature stable, and shear stable. They are also more effective than many of the prior art compounds.

Another series of kaolin clay dispersions were prepared using the technique described above and various deflocculating agents of our invention. The dispersions were stored for one month or longer at 65°C. The results are shown in Table 2.

TABLE 2

| deflocculating agent | concentration in percent by Wt. | storage time in days | viscosity in cps |
|---|---|---|---|

| deflocculating agent | | |
|---|---|---|
| Alpha aminobenzyl diphosphonic acid (sodium salt) | 0.25 | 0 | 460 |
| | 0.25 | 7 | 1,050 |
| | 0.25 | 14 | 1,500 |
| | 0.25 | 21 | 8,000 |
| | 0.25 | 28 | dilatant |
| Alpha aminobenzyl diphosphonic acid (lithium salt) | 0.25 | 0 | 50 |
| | 0.25 | 7 | 75 |
| | 0.25 | 14 | 150 |
| | 0.25 | 21 | 100 |
| | 0.25 | 28 | 150 |
| | 0.25 | 35 | 350 |
| | 0.25 | 42 | 450 |
| | 0.25 | 49 | 1,000 |
| Alpha aminobenzyl dimethylene phosphonic acid (sodium salt) | 0.5 | 0 | 75 |
| | 0.5 | 7 | 75 |
| | 0.5 | 14 | 75 |
| | 0.5 | 21 | 75 |
| | 0.5 | 28 | 75 |

The results of Table 2 also clearly illustrate that our compounds are effective deflocculating agents and are temperature stable and hydrolytically stable.

A series of dispersions were prepared using our deflocculating agents and clay. The dispersions were evaluated by the Rohm and Haas pigment dispersant procedure described in the Rohm and Haas Resin Review, Vol. XVIII, No. 3, Page 9. The results are shown in Table 3.

TABLE 3

| deflocculating agent | concentration in percent by wt. | viscosity in cps |
|---|---|---|
| Alpha aminobenzyl diphosphonic acid (sodium salt) | 0.25 | 400 |
| Lithium salt | 0.25 | 50 |
| Ammonium salt | 0.5 | 610 |
| Alpha aminobenzyl dimethylene phosphonic acid (sodium salt) | 0.5 | 75 |

In addition to the data in the above tables, we have tested other compounds of our invention on various other finely divided solids. For example, we have found that 1 amino 1 methyl methane 1,1 diphosphonic acid and its water-soluble salts ($\alpha$ aminoethane diphosphonic acid) are very effective deflocculating agents for calcium carbonate.

Our compounds are also effective deflocculating agents for water-based latex paints. Various levels of our amino diphosphonates substituted into typical paint formulations for the presently used deflocculating agent will yield acceptable commercial paints. An example of one of the paint formulations is a high quality white topcoat comprising 67 grams of water, 8 to 13 grams of amino diphosphonate deflocculating agent, 2 grams of a nonionic surfactant, 1 gram of an antifoam agent, 20 grams of ethylene glycol, 1.4 grams of a biocidal preservative, 76 grams of a 2.5 percent by weight aqueous solution of hydroxy ethyl cellulose, 192 grams of non-chalking rutile titanium dioxide, 8 grams of free chalking anatase titanium dioxide, 80 grams of talc, 89.5 grams of calcium carbonate, 398 grams of Rhoplex AC-35, 5.6 grams of pine oil and 1.6 grams of ammonium hydroxide. An example of another paint formulation is a vinyl chloride-acrylic exterior white house paint comprising 108 grams of water, 204 grams non-ionic surface active agent, 16 grams of ethylene glycol, 4.4 grams of amino methyl propanol, 5 to 9 grams of amino diphosphonate deflocculating agent, 4 grams antifoaming agent, 20 grams of anatase titanium dioxide, 112 grams of Nytal 300, 190 grams of Titanox RA-50, 80 grams of a 2½ percent kilogram weight solution of hydroxyethyl cellulose and 77 grams of BFG-12273 (Long Oil Alkyd Intermediate). The above two examples illustrate that our amino phosphonates will be effective deflocculating agents for water-based paints.

The compounds of our invention are also effective defloccultants for clay drilling muds. They are compatible with most additives used in clay drilling muds such as salt, caustic soda, soda ash, lime, gypsum cement, and weighting agents such as iron oxide.

As mentioned previously, the amino diphosphonates of our invention are particularly suited for preparing pigment and clay slurries for use in paper coatings. Our compounds are especially effective in preparing high solids, low viscosity slurries of the pigments and clays used in the paper coating field. Some of the more common clays and pigments used in paper technology which our amino diphosphonates will deflocculate are titanium dioxide, calcium carbonate, talc, silica, basic lead silicate, and zinc oxide.

We claim:

1. An aqueous dispersion comprising finely divided solids dispersed in an aqueous medium with a water-soluble amino diphosphonate deflocculating agent of the formula

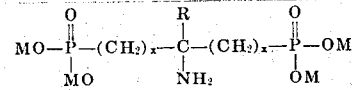

where R is selected from the group consisting of alkyl groups of one to five carbon atoms, phenyl and benzyl, $x$ is 0 or 1 and each M is independently selected from the group consisting of hydrogen, alkali metal, alkaline earth metal and ammonium.

2. An aqueous dispersion as in claim 1 wherein the finely divided solids are comprised of kaolin clay.

3. An aqueous dispersion as in claim 1 wherein the amino diphosphonate is present in concentrations of from 0.01 to about 2.5 percent by weight based on the weight of the finely divided solids.

4. An aqueous dispersion as in claim 1 wherein the amino diphosphonate is aminobenzyl diphosphonic acid.

5. An aqueous dispersion as in claim 1 wherein the amino diphosphonate is aminobenzyl dimethylene phosphonic acid.

6. An aqueous dispersion comprising kaolin clay dispersed in an aqueous medium with from 0.1 to 1.0 percent by weight based on the weight of the kaolin clay of a water-soluble amino diphosphonate deflocculating agent of the formula

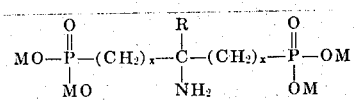

where R is selected from the group consisting of alkyl groups of one to five carbon atoms, phenyl and benzyl, $x$ is 0 or 1 and each M is independently selected from the group consisting of hydrogen, alkali metal, alkaline earth metal and ammonium.

7. Method of preparing a stable aqueous dispersion of finely divided solids comprising dissolving in the aqueous medium a water-soluble amino diphosphonate of the formula

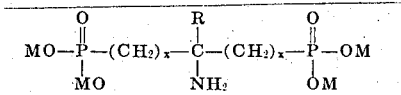

where R is selected from the group consisting of alkyl groups of one to five carbon atoms, phenyl and benzyl, $x$ is 0 or 1 and each M is independently selected from the group consisting of hydrogen, alkali metal, alkaline earth metal and ammonium.

8. Method of claim 7 wherein the finely divided solids are comprised of kaolin clay.

9. Method of claim 8 wherein the aminodiphosphonate is added in amounts of from 0.01 to about 2.5 percent by weight based on the weight of the finely divided solids.

* * * * *